United States Patent [19]

Denton et al.

[11] 4,089,550

[45] May 16, 1978

[54] ROTARY GAS SEAL

[75] Inventors: Norman Denton, Old Harlow; Andrew Baxter Harding, Bishops Stortford, both of England

[73] Assignee: International Standard Electric Corporation, New York, N.Y.

[21] Appl. No.: 752,353

[22] Filed: Dec. 20, 1976

[30] Foreign Application Priority Data

Mar. 18, 1976 United Kingdom ............... 10926/76

[51] Int. Cl.² ............................................. F16L 17/02
[52] U.S. Cl. ................................................... 285/276
[58] Field of Search ............... 277/14 V, 135, 102; 308/187.1, 187.2, 36.1; 285/134, 272, 275, 276

[56] References Cited

U.S. PATENT DOCUMENTS

| | | | |
|---|---|---|---|
| 1,797,382 | 3/1931 | Wade | 285/275 |
| 1,931,706 | 10/1933 | Powell | 277/135 |
| 2,088,418 | 7/1937 | King | 285/275 |
| 3,129,960 | 4/1964 | Schrodt | 285/275 |

FOREIGN PATENT DOCUMENTS 728,431  4/1955  United Kingdom ............... 285/134

Primary Examiner—William Price
Attorney, Agent, or Firm—John T. O'Halloran; Peter C. Van Der Sluys

[57] ABSTRACT

A rotary gas seal provides a gas tight connection between a pair of pipes having a common axis wherein one pipe is capable of rotation with respect to the other about their common axis. One of the pipes extends into the interior of a tubular seal member through an end wall to which it is secured by a rigid gas tight seal. The other pipe is rotatably sealed to the seal member by a gas tight gland. The seal member is secured in one part of a rotary bearing so that the bearing axis lies on the common axis of the pipes while the other pipe is secured to another part of the bearing.

8 Claims, 1 Drawing Figure

ROTARY GAS SEAL

BACKGROUND OF THE INVENTION

This invention relates to rotary gas seals for providing a gas-tight connection between a pair of pipes having a common axis wherein one pipe is capable of rotation with respect to the other about their common axis. The invention finds particular application in the design of rotary gas seals for use with corrosive gases and vapours such as may be used in chemical vapour reactions used to deposit glass upon the bore of a glass tube.

SUMMARY OF THE INVENTION

According to the present invention there is provided a rotary gas seal for providing a gas-tight connection between a pair of pipes having a common axis wherein one pipe is capable of rotation with respect to the other about their common axis, wherein one of the two pipes extends into the interior of a tubular seal member through an end wall thereof to which it is secured by a rigid gas-tight seal, while the other pipe is rotatably sealed to the seal member in the neighborhood of the other end of the seal member by a gas-tight gland, and wherein the seal member is secured in one part of a rotary bearing so that the bearing axis lies on the common axis of the pipes while said other pipe is secured to the other part of the bearing.

DESCRIPTION OF THE PREFERRED EMBODIMENTS

Figure 1:
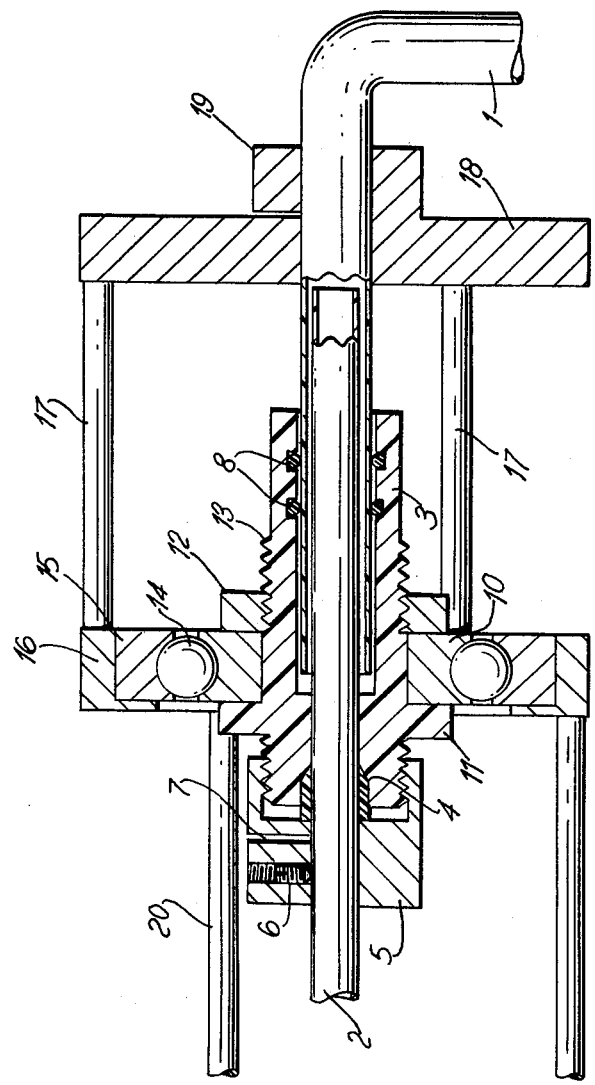
FIG. 1 is a sectional view of the rotary seal of this invention.

The rotary seal of FIG. 1 is designed for use in the manufacture of glass optical fibre by a process involving the deposition by a chemical vapour oxidation reaction of glass upon the bore of a glass tube, typically made of fused silica. When the deposition has been completed the bore of the coated tube is collapsed and the structure is drawn into fibre. The light guiding structure of the completed fibre is provided by or contained in the material deposited by the chemical vapour reaction. It will be apparent that in order to achieve low loss optical fibre it is essential to keep contamination of the deposit to a minimum.

The glass tube is continuously rotated during the deposition process, and hence it is necessary to provide a rotary seal between this tube, or a pipe rigidly connected to the tube, and a feed pipe delivering the gases and vapours necessary for the vapour reaction. Leakage at this seal is highly undesirable: leakage into the atmosphere, because the reagents tend to corrode; leakage from the atmosphere, because this is liable to contaminate the reagents. One particular contaminant that leakage from the atmosphere is liable to introduce is hydrogen or hydrogen containing compounds. These are undesirable because they are liable to result in the incorporation of —OH groups into the deposit which produce a number of optical absorption bands, and can lead to the formation of bubbles.

For these reasons it is preferred to use a construction of rotary seal in which the reagents can only come into contact with parts made either of glass or of a fluorinated polymer such as polytetrafluoroethylene. One of these parts must be some form of gland where one part slides over another. This gland is preferably made of a fluoroelastomer such as that sold under the Trade Mark VITON. In principle this gland could form the sole bearing between the two parts of the rotary seal, but it has been found that under these circumstances the two parts tend to produce excessive wear of the gland as a result of not running sufficiently true. The wear gives rise to the generation of swarf which is liable to be entrained in the reagents and produce contamination, and the gland relatively quickly becomes insufficiently gas-tight. By the use of a separate bearing at the rotary seal the two parts may be constrained to run true thereby reducing both the leakage and the generation of swarf.

Referring now to the accompanying drawing, the rotary seal efforts a gas-tight connection between a fixed pipe 1 and a rotating pipe 2. The two pipes lie on a common axis, and pipe 2 rotates about this axis. Reagents for the chemical vapour reaction are delivered via the stationary pipe 1 to the rotating pipe 2, which is rigidly fixed to the reaction tube (not shown) in which the deposition reaction takes place. The reaction tube is rotated in the chuck of a lathe (not shown). Typically the reagents consist of a silicon halide vapour such as $SiCl_4$ entrained in dry oxygen. To this may be added small quantities of halide vapours of other elements, such as germanium, to produce a doped silica as the reaction product. Typically these additives are also entrained in oxygen.

Pipe 2 is secured with a rigid demountable compression seal through the end wall of a tubular seal member 3 made of polytetrafluoroethylene. In this demountable seal a polytetrafluoroethylene ferrule 4 is urged into a co-operating orifice in the end wall of the said member by a threaded nut 5. Optionally the nut may be locked against rotation with the aid of a grub-screw 6. In this case a slot 7 is provided in the nut to reduce the risk that tightening of the grub-screw will disturb the seating of the ferrule 4. Alternatively the nut may be locked in position with a split clamp arrangement.

Near the other end of the seal member 3 a pair of grooves house a pair of 0-rings 8 made of a fluoroelastomer sold under the Trade Mark VITON. These O-rings 8 act as a gland providing a gas-tight seal between the seal member 3 and pipe 1 which is introduced through their centres. Pipes 1 and 2 are preferably made of polytetrafluoroethylene though alternatively they may be made of glass. In the case of pipe 1 a reason for preferring polytetrafluoroethylene is that the coefficient of friction between the fluoroelastomer and polytetrafluoroethylene is lower than that between the fluoroelastomer and glass.

The pipe 1 extends into the seal member well beyond the inner O-ring and terminates just short of the end wall. The pipe 2 extends well into pipe 1 so that in this way a labyrinth is provided for swarf from the O-rings to travel before it can become entrained in the main gas flow.

The seal member 3 fits through the central aperture of the inner race 10 of a rigid anti friction bearing which is clamped between a flange 11 on the seal member and a threaded nut 12 engaged over a threaded portion 13 of the seal member. The inner race 10 is supported on balls 14 in an outer race 15. The outer race is a press fit in a housing 16. Three rods 17 secured in this housing 16 carry a plate 18 having a central aperture through which the pipe 1 is a push fit. The pipe is secured through this aperture by a split clamp arrangement forming part of a boss 19 protruding from the plate 18.

The aperture in the plate 18 is aligned to lie on the axis of the bearing so that pipe 1 is held on axis by this plate while pipe 2 is held on axis by the seal member 3. Optionally the housing 16 is secured by three rods 20 to a fixed part of the lathe (not shown) used to rotate the reaction tube.

It is to be understood that the foregoing description of specific examples of this invention is made by way of example only and is not to be considered as a limitation on its scope.

What is claimed is:

1. A rotary gas seal for providing a gas-tight connection between first and second pipes having a common axis wherein one pipe is capable of rotation with respect to the other about their common axis, comprising:
    a tubular seal member having an end wall with an aperture therein, said first and second pipes extending into said tubular seal member from opposite directions;
    a rotary bearing having first and second annular portions, said first annular portion rigidly coupled to said second pipe for securing said second pipe, and said second annular portion rigidly coupled to said tubular seal member to provide rotation to said tubular seal member;
    a rigid gas-tight seal in said aperture for securing said first pipe; to said tubular seal member and
    a gas-tight gland coupled between said tubular sealing member and said second pipe.

2. A rotary gas seal as claimed in claim 1 wherein said first pipe extends into said second pipe so as to form a labyrinth impeding the entrainment of swarf from the gland into gas flowing from either pipe to the other.

3. A rotary gas seal as claimed in claim 1 wherein the gas tight gland is provided by one or more O-rings.

4. A rotary gas seal as claimed in claim 3 wherein the O-ring or rings are made of a fluoroelastomer.

5. A rotary gas seal as claimed in claim 1 wherein the seal member is made of polytetrafluoroethylene.

6. A rotary gas seal as claimed in claim 1 wherein the two pipes are made of polytetrafluoroethylene.

7. A rotary gas seal as claimed in claim 1 wherein said first pipe is secured through the end wall of the seal with a demountable compression seal.

8. A rotary gas seal as claimed in claim 1 wherein the rotary bearing is a rigid ball or roller bearing.

* * * * *